(12) United States Patent
Mazyck et al.

(10) Patent No.: US 10,226,778 B2
(45) Date of Patent: Mar. 12, 2019

(54) SYSTEMS, LANCES, NOZZLES, AND METHODS FOR POWDER INJECTION RESULTING IN REDUCED AGGLOMERATION

(71) Applicant: Carbonxt, Inc., Gainesville, FL (US)

(72) Inventors: David W. Mazyck, Gainesville, FL (US); Heather Byrne, Portland, OR (US)

(73) Assignee: CARBONXT, INC., Gainesville, FL (US)

( * ) Notice: Subject to any disclaimer, the term of this patent is extended or adjusted under 35 U.S.C. 154(b) by 0 days.

(21) Appl. No.: 14/754,297

(22) Filed: Jun. 29, 2015

(65) Prior Publication Data

US 2017/0361340 A1    Dec. 21, 2017

Related U.S. Application Data

(60) Provisional application No. 62/019,245, filed on Jun. 30, 2014.

(51) Int. Cl.
 *B05B 1/34*    (2006.01)
 *B01D 53/10*   (2006.01)
 (Continued)

(52) U.S. Cl.
 CPC ............. *B05B 1/34* (2013.01); *B01D 53/10* (2013.01); *B05B 1/005* (2013.01); *B05B 7/14* (2013.01);
 (Continued)

(58) Field of Classification Search
 CPC ................................................... B05B 1/34
 (Continued)

(56) References Cited

U.S. PATENT DOCUMENTS 3,112,194 A * 11/1963 De Vries ............... C21C 5/32
                                                    75/10.41
3,269,829 A *  8/1966 Belkin ............... C21C 5/4606
                                                    239/132
(Continued)

FOREIGN PATENT DOCUMENTS

EP    2463014 A1    6/2012
JP    3376511 B2    7/1997
JP   2000279765 A  10/2000

OTHER PUBLICATIONS

Lee, E.; Clark, H. In Situ Detection of Altered Particle Size Distributions during Simulated Powdered Sorbent Injection for Mercury Emissions Control. Energy Fuels. 2010, 24,5.

(Continued)

*Primary Examiner* — Scott R Kastler
(74) *Attorney, Agent, or Firm* — Lathrop Gage LLP (57) ABSTRACT

A lance for powder injection resulting in reduced agglomeration, including an outer tubular member having a first end, a second end, and an inner flowpath extending from the first end to the second end; an inner tubular member having a first end, a second end, and a, inner flowpath extending from the first end to the second end, the inner tubular member disposed within the inner flowpath of the outer tubular member for providing an annular space between the outer tubular member and the inner tubular member; and one or more orifices in the inner tubular member for providing a flowpath between the annular space and the inner flowpath of the inner tubular member. Additional lances, systems, and methods are also included.

8 Claims, 7 Drawing Sheets

(51) Int. Cl.
*F23J 15/00* (2006.01)
*B05B 1/00* (2006.01)
*B05B 7/14* (2006.01)

(52) U.S. Cl.
CPC ....... *F23J 15/003* (2013.01); *B01D 2253/102* (2013.01); *B01D 2257/602* (2013.01); *B01D 2258/0283* (2013.01); *B01D 2259/128* (2013.01); *F23J 2215/60* (2013.01)

(58) Field of Classification Search
USPC ........................................................ 266/225
See application file for complete search history.

(56) References Cited

U.S. PATENT DOCUMENTS

| | | | |
|---|---|---|---|
| 5,681,536 A | 10/1997 | Swoboda et al. | |
| 5,685,243 A | 11/1997 | Gohara et al. | |
| 6,521,021 B1 | 2/2003 | Pennline et al. | |
| 7,361,209 B1 | 4/2008 | Durham | |
| 7,731,780 B1 | 6/2010 | Durham et al. | |
| 8,080,200 B2 * | 12/2011 | Kroemmer | C21B 5/003 266/225 |
| 8,110,029 B2 | 2/2012 | Matteson | |
| 8,578,965 B2 | 11/2013 | Klages et al. | |
| 2011/0097674 A1 | 4/2011 | Liu | |
| 2011/0262327 A1 | 10/2011 | Dillon et al. | |
| 2013/0199647 A1 | 8/2013 | Tabikh et al. | |
| 2013/0213511 A1 | 8/2013 | Yukimura et al. | |
| 2014/0030178 A1 | 1/2014 | Martin | |

OTHER PUBLICATIONS

Sjostrom, S.; et al, Influence of SO3 on Mercury Removal with Activated Carbon: Full Scale Results. Fuel Processing Technology. 2009, 90, 1419-1423.

Hopkins, M.; Mutoh, O. Predicting PAC, Hydrated Lime, and Trona Injection Effectiveness in Flue Gas Systems Using CFD and Physical Flow Analysis for Optimized Nozzle Design.

. . . BB-1838. Presented at the 35th International Technical Conference on Coal Utilization and Fuel Systems. Jun. 6-10, 2010, Clearwater, FL.

European Patent Application No. 15771744.8, Communication pursuant to Rule 164(2)(b) and Article 94(3) EPC dated Aug. 31, 2018, 22 pgs.

* cited by examiner

PRIOR ART

SYSTEMS, LANCES, NOZZLES, AND METHODS FOR POWDER INJECTION RESULTING IN REDUCED AGGLOMERATION

CROSS-REFERENCE TO RELATED APPLICATIONS

This application claims the benefit of U.S. Provisional Patent Application No. 62/019,245, filed Jun. 30, 2014. The entirety of this aforementioned application is incorporated herein by reference.

TECHNICAL FIELD OF THE INVENTION

This invention relates, in general, to systems for reducing agglomeration of injected powder and, in particular, to systems, lances, nozzles, and methods for powder injection resulting in reduced agglomeration.

BACKGROUND OF THE INVENTION

Without limiting the scope of the present invention, its background will be described in relation to systems for reducing agglomeration of injected powder and, in particular, to systems, lances, nozzles, and methods for powder injection resulting in reduced agglomeration, as an example.

With the introduction of the first national standards for mercury pollution from power plants in 2011, many facilities will turn to activated carbon injection (ACI) to meet the regulatory requirements. ACI is a mature technology that is widely available and proven for achieving mercury removal to the required levels. ACI involves the pneumatic conveyance of a powdered activated carbon (PAC) or other type of powdered sorbent from a storage silo into the process gas of a power plant. Once introduced to the process gas, the sorbent adsorbs mercury. The sorbent and associated mercury is separated from the process gas by a particulate removal device resulting in lower concentrations of mercury in the gas.

Most development work for this methodology has focused on controlling and modifying the PAC or other powdered sorbents to maximize their potential reaction with mercury. The result of these efforts has been to introduce oxidizing components to the sorbent as well as minimize particle size and pore diffusion resistance to accelerate the kinetic reaction to match system constraints.

Commercial systems are readily available for powder flow transport and delivery and have been adapted for ACI systems. These systems include a powder storage vessel with some means of fluidization, a flow path to a feed hopper that uses various combinations of valves and screws to convey powder to an eductor, and transport lines that convey transport air and powder to injection lances, as further discussed below with reference to FIGS. 1A1-1C2. The entire system must operate continuously without plugging or clogging to introduce powder to the flue gas. The delivery of the powder from the injection lances is critical to the resulting reactions in the process gas. ACI installations at existing power plants are limited by the given process framework and therefore locations where the ACI system can be installed and (therefore where the powder can be injected) is limited.

This often constrains the available contact time for PAC to adsorb mercury (as defined by the time the PAC enters the gas environment in the duct system to the time it is removed by the particulate control device). In addition to this constraint, process gases are generally high volume flows thereby having low concentrations of contaminants, especially in the case for mercury. With limited time and low concentration of the target contaminant to be removed, it is critical to maximize the dispersion (and therefore reactive surface area) and the particle distribution of the sorbent in the process gas to in turn maximize the contaminant removal potential.

As used herein, "dispersion" will be referred to as the degree of agglomeration, or how well the actual average particle size matches that of the primary particle size. Highly dispersed powders are those in which there is little to no agglomeration and the actual average particle size is equivalent to the primary particle size. Low dispersion would conversely mean that there is a large degree of agglomeration and the actual average particle size is much larger than that of the primary particle size. Distribution of the particles herein will refer to the degree that particles are separated from each other and their location in the process gas. High dispersion conditions will have particles that are well separated and fill the process gas volume thereby having good interaction with the process gas. Low dispersion conditions may have streamlining where particles are in closer proximity to each other and occupy only a portion of the available volume.

Fine powders have an inherent cohesive tendency and form agglomerates. Therefore, when agglomerates form, the average particle size of the powder being introduced into the process gas will have a larger size than the primary particle size originally produced. Larger particle size leads to less available reactive external surface area and less particle gas interaction. This works against high levels of contaminant removal from process gas. This is especially so in the case of mercury removal from flue gas where mercury removal is mass transfer limited. Despite the efforts to improve the PAC reactivity, if its surface area is not readily accessible, mercury removal will be limited.

This theory was demonstrated using an in-line particle size measurement tool that monitored particle size in the flue gas with increasing injection rates. The tendency of PAC to agglomerate increased with increased particle feed rate. As PAC agglomerates, much of its surface area gets blocked off and is no longer exposed directly to the process gas. These measurements explain the phenomena of the mercury removal performance plateau exhibited in many ACI systems despite increasing injection rates. Therefore, if agglomeration can be eliminated and particles reduced back to their primary particle size, the linear trend of increasing mercury removal with increasing injection rates could be maintained.

Figure 1A:
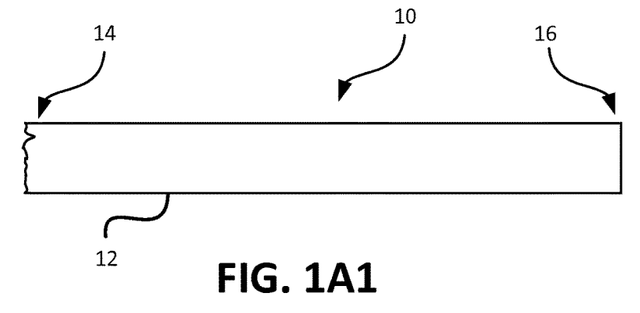
Figure 1A:
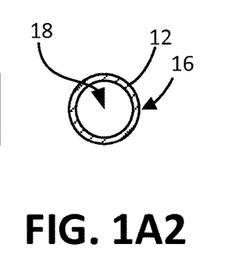
Figure 1B:
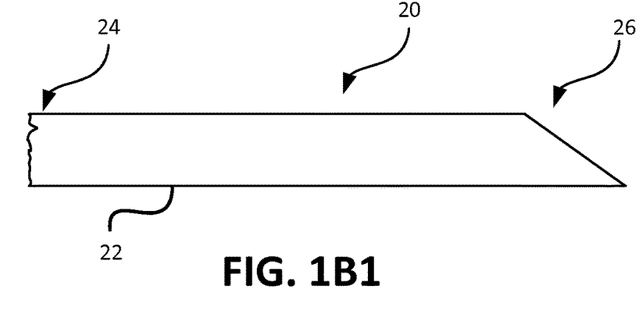
Figure 1B:
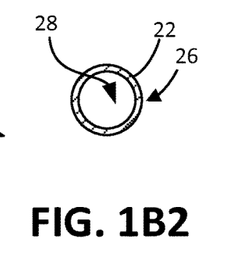

Several styles of lances are commonplace in ACI systems currently employed. Referring to FIGS. 1A1-1C2, several prior art lances are discussed. The main style of lance employed is a lance 10 having a tubular body 12 and one end 14 that connects with a supply of pneumatically powered powder, such as ACI (FIGS. 1A1-1A2). Lance 10 may have a second end 16 that is substantially square or flat and having an opening 18 where ACI flows outward. Another configuration includes a lance 20 having a tubular body 22 and one end 24 that connects with a powdered ACI (FIGS. 1B1-1B2). Lance 20 may also include a second end 26 that may be angled and having an opening 28 where ACI flows outward.

Figure 1C:
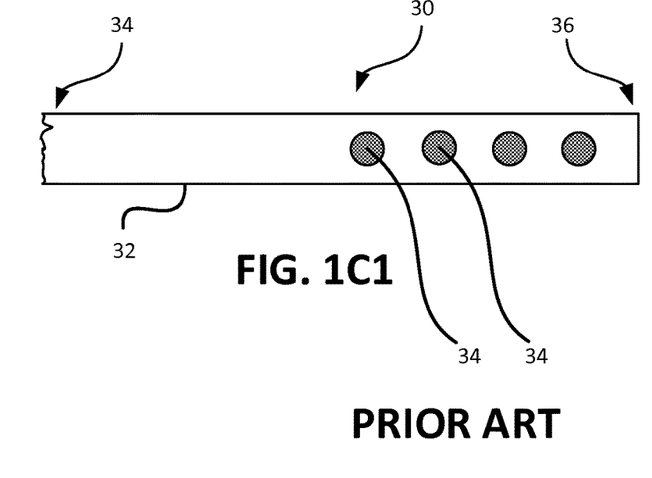
Figure 1C:
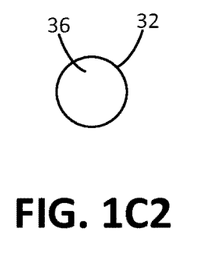

While these lance designs have low tendency to plug, they also do a poor job of dispersing and distributing the powder particles. Increasing the number of lances in a cross section and staggering their injection lengths can improve this distribution. More lances, however, comes with the drawback of larger pressure drop in the lines which can lead to sedimentation and clogging or necessitate a larger flow or pressure air supply. Another commonly applied design tries to improve particle distribution by using an injection lance 30 having a tubular body 32 and one end 34 that connects with a powdered ACI (FIGS. 1C1-1C2). Lance 30 may also include several holes 34 along the vertical length of body 32. Tubular body may have a closed end 36. While this design allows for better distribution of powder across the duct cross-section and less lances, it is prone to clogging. These traditional lances, without a mechanism to de-agglomerate powder particles, lack the ability to finely disperse the powder particles which limits the upper level of possible contaminant removal despite how well of a distribution can be achieved.

In another method in previous use, a system to re-mill PAC just prior to injection into the flue gas may be used. This would remove agglomerates formed during storage and transportation. However, during conveyance and injection in the ACI system, particles will have a chance to re-form agglomerates thereby limiting the potential of the powder to react and capture mercury. In addition, if the applied lance design used in conjunction with the milling system does not distribute these particles well in the flue gas cross section, mercury removal will again be limited.

Another method to introduce additives to contaminant-containing gases includes compressing a gas, contacting the additive with the compressed gas, mixing the additives and gas, and delivering the mixture to contaminant-containing gas stream delivery system of a manifold and many conduits, or lances. While this system claims to improve distribution of the additives, it does not include methods to improve particle distribution.

Another method for ACI known to those skilled in the art is a typical pneumatic injection system that injects particles into a gas duct that contains a static mixer. The design is intended to improve powder distribution in the duct itself and requires little to no maintenance. While this method improves on particle distribution, again, there are no means to disperse the particles to their primary particle size and increase the available reactive surface area. Additionally, integrating the static mixer requires replacing a portion of the duct while the power plant is not operating incurring high cost and inconvenience.

Another system is an integrated mercury control system that includes a sorbent injection subsystem wherein the system adapted to disperse sorbent particles within the flue gas stream at a defined rate for the sorbent particles to adsorb gaseous pollutants. As part of this subsystem, injection lances were comprised of various conduits. These conduits consist of a first end where the sorbent material is fed into and the product travels down the length of the conduit to a second end where the sorbent particles are released. The varying vertical lengths allow for greater distribution of the particles. While the disclosure claims that the amount of clumping of particles is reduced by the straight flow, low-pressure conduits with no curves or angles, there are no means to disperse already formed clumps or agglomerates.

SUMMARY OF THE INVENTION

This present invention disclosed herein is directed to dispersing the PAC by creating an environment that breaks particle agglomerates to disperse the particles to their primary particle size rather than the larger agglomerated clusters thus increasing distribution of the particles in the flue gas duct. Creating this environment promotes both dispersion in the flue gas cross-section and increased available external surface area for reaction that lead to improved contaminant removal. With limited contact time for these reactions to occur, both variables are critical for effective contaminant removal.

Advanced lance systems of the present invention include modified lance designs that focus on a nozzle geometry in which flow profiles induce the breaking of agglomerates to reduce the average particle size down closer to the primary particle sizes of powder PAC. The breakup of agglomerated powder is influenced by four mechanisms. First, local accelerations induce forces on agglomerates that break the agglomerates apart. Second, agglomerates break apart when they interact with other agglomerates in the system. Third, agglomerates break when they interact with a boundary (physical, static, or dynamic). Fourth, agglomerates break when subjected to gas pressure acting within the agglomerate, which induces sufficient stress in the agglomerate to overcome attractive forces between particles. These principles were applied to develop the disclosed lance designs. Some designs are given below as examples but are not intended to be all-inclusive. These designs may be referred to as lances, nozzles, and/or agglomeration reduction systems.

In one embodiment, the present invention may be directed to a lance for powder injection resulting in reduced agglomeration, including an outer tubular member having a first end, a second end, and an inner flowpath extending from the first end to the second end; an inner tubular member having a first end, a second end, and an inner flowpath extending from the first end to the second end, the inner tubular member disposed within the inner flowpath of the outer tubular member for providing an annular space between the outer tubular member and the inner tubular member; and one or more orifices in the inner tubular member for providing a flowpath between the annular space and the inner flowpath of the inner tubular member.

In one aspect, the annular space may be sealed at the first end of the inner tubular member and outer tubular member. In another aspect, the first end of the inner tubular member may include one or more of a nozzle, lance end, and outlet. In yet another aspect, the one or more orifices are disposed through the longitudinal axis of the inner tubular member. Also, the one or more orifices may be disposed through the inner tubular member in one or more different radial positions about the circumference of the inner tubular member. Additionally, the inner tubular member and the outer tubular member are substantially coaxial. Further, the one or more orifices may be angled for providing a tangential directional flowpath between the annular space and the inner flowpath of the inner tubular member.

In another embodiment, the present invention may be directed to a nozzle for powder injection resulting in reduced agglomeration, including a tubular member having a sealed first end, a second end, and an inner flowpath extending from the sealed first end to the second end, the tubular member having one or more orifices disposed therethrough; and one or more flow agitation baffles disposed a distance about the outer surface of tubular member substantially proximal to the one or more orifices.

In one aspect, the nozzle may include one or more supports for supporting the one or more flow agitation baffles the distance about the outer surface of the tubular member. In another aspect, each of the one or more flow agitation baffles may create a turbulent flow profile to at least two of the one or more orifices. In yet another aspect, the at least one or more flow agitation baffles may be disposed linearly along the longitudinal axis of the outer surface of the tubular member.

Also, the at least one or more flow agitation baffles may be disposed in different positions about the radius of the outer surface of the tubular member. Additionally, the one or more flow agitation baffles may have a profile selected from the group consisting polygonal forms, symmetrical forms, and asymmetrical forms. Further, one of the one or more supports may be disposed between the one or more orifices. In still yet another aspect, one of the form and shape of the flow agitation baffles may be selected from the group consisting of planar, curved, and curvilinear.

In yet another embodiment, the present invention may be directed to a nozzle for powder injection resulting in reduced agglomeration, including a tubular member having a sealed first end, a second end, and an inner flowpath extending from the first sealed end to the second end, the tubular member having an orifice disposed therethrough proximal to the sealed first end; and a dispersion plate disposed a distance about the outer surface of tubular member substantially proximal to the orifice. In one aspect, the nozzle may include a support for supporting the dispersion plate a distance about the outer surface of the tubular member. Also, the dispersion plate may create a turbulent flow profile to the orifice.

In yet another aspect, the dispersion plate has a profile selected from the group consisting polygonal forms, symmetrical forms, and asymmetrical forms. In still yet another aspect, one of the form and shape of the dispersion plate may be selected from the group consisting of planar, curved, and curvilinear.

In still yet another embodiment, the present invention may be directed to a powdered activated carbon injection unit, including a source of the process gas; and a lance in contact with the process gas having an outer tubular member having a first end, a second end, and an inner flowpath extending from the first end to the second end; an inner tubular member having a first end, a second end, and an inner flowpath extending from the first end to the second end, the inner tubular member disposed within the inner flowpath of the outer tubular member for providing an annular space between the outer tubular member and the inner tubular member; and one or more orifices in the inner tubular member for providing a flowpath between the annular space and the inner flowpath of the inner tubular member.

In one aspect, the annular space may be sealed at the first end of the inner tubular member and outer tubular member. In another aspect, the first end of the inner tubular member may include one or more of a nozzle, lance end, and outlet.

In still yet another embodiment, the present invention may be directed to a powdered activated carbon injection unit, including a source of the process gas; and a nozzle in contact with the process gas having a tubular member having a sealed first end, a second end, and an inner flowpath extending from the sealed first end to the second end, the tubular member having one or more orifices disposed therethrough; and one or more flow agitation baffles disposed a distance about the outer surface of tubular member substantially proximal to the one or more orifices.

In one aspect, the first end of the inner tubular member may include one or more of a nozzle, lance end, and outlet. In another aspect, the powdered activated carbon injection unit may include one or more supports for supporting the one or more flow agitation baffles the distance about the outer surface of the tubular member. In yet another aspect, each of the one or more flow agitation baffles may create a turbulent flow profile to at least two of the one or more orifices.

In another embodiment, the present invention may include a method for powder injection resulting in reduced agglomeration, including providing a process gas; and providing a lance having a turbulent flow device for injecting dispersed powdered activated carbon for contacting the process gas.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1A1 is a side view of a prior art injection lance;
FIG. 1A2 is an end view of the prior art injection lance of FIG. 1A1;
FIG. 1B1 is a side view of a prior art injection lance;
FIG. 1B2 is an end view of the prior art injection lance of FIG. 1B1;
FIG. 1C1 is a side view of a prior art injection lance;
FIG. 1C2 is an end view of the prior art injection lance of FIG. 1C1.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not limit the scope of the present invention.

The various embodiments of the present invention generally relate to a system, lances, nozzles, and/or methods for introducing a powder, such as a powdered activated carbon ("PAC") and/or activated carbon, into a gas stream with a high degree of dispersion and distribution. In the following description, the term PAC may be used primarily, but the description also applies to activated carbon, and the like as would be commonly known to those skilled in the art. The gas stream and/or process gas stream may originate from many industrial facilities such as a power plant, cement plant, waste incinerator, or other facilities that will occur to one skilled in the art. Such gas streams contain many contaminants that are desirable to control and/or decrease in concentration for protection of health and the environment.

Figure 2:
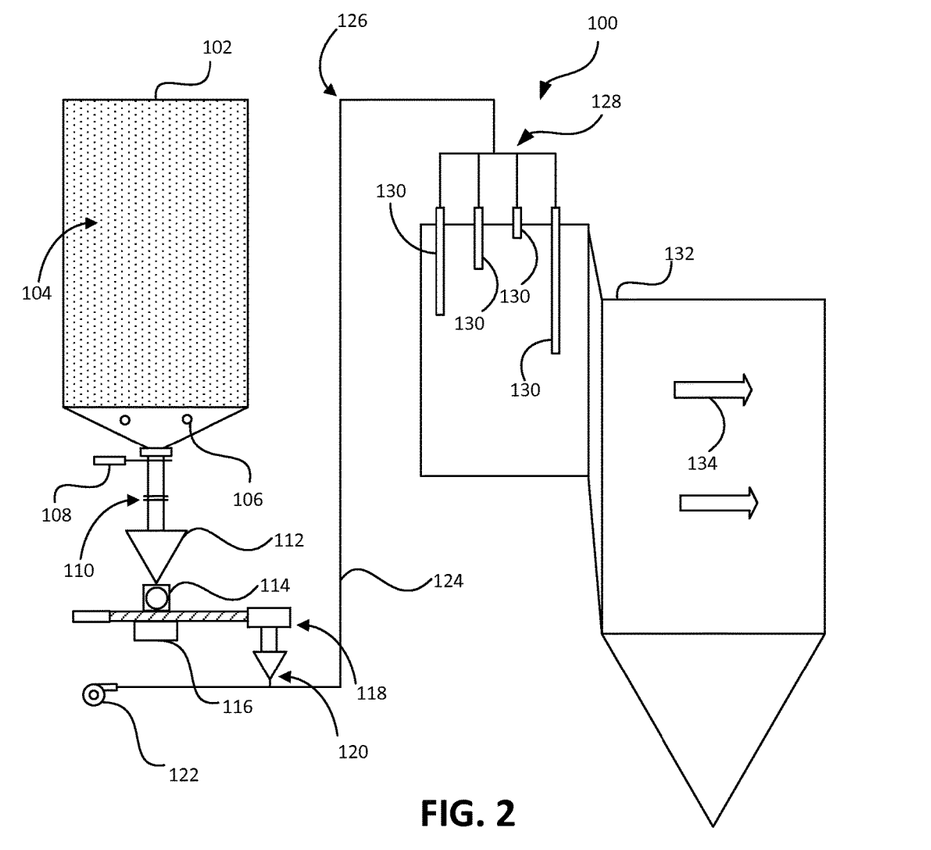
FIG. 2 is a block diagram of a pneumatic system having lances and/or nozzles for injecting powdered activated carbon into a gas flow according to an embodiment.

Referring initially to FIG. 2, an embodiment of a system for injecting PAC into a process gas for controlling or reducing pollutants in a gas stream is schematically illustrated and generally designated 100. In one embodiment, system 100 may include an activated carbon injection ("ACI") system. System 100 may include a PAC storage vessel, such as activated carbon silo 102, where PAC 104 may be stored for use in system 100. Activated carbon silo 102 may be any type of storage vessel such that it is capable of containing a supply and/or feedstock of PAC for supplying the PAC to other units and the like of system 100. Some additional exemplary activated carbon silos 102 may include supersacs, silos, storage vessels, and the like.

In one embodiment, system 100 may include one or more fluidizing nozzles 106 that may assist in providing PAC 104 in a fluidized form, such that it may be transported in a substantially fluid form downstream in system 100. Additionally, system 100 may include one or more control valves 108 that may be disposed and/or located substantially proximal to the exit or outlet of PAC 104 and/or fluidizing nozzles 106 for controlling the flow of PAC 104 from activated carbon silo 102 to system 100. The feed of PAC 104 can also be controlled by a series of additional control valves 108, movable barriers, etc. To assist the process of fluidizing PAC 104 for exiting activated carbon silo 102, fluidization assistance may be applied in the form of physical agitation or the use of fluidizing nozzles 106. In addition, system 100 may include other types of control valves, such as manual valves (not shown), and the like as would be known to those skilled in the art.

System 100 may further include a movement joint or expansion joint 110 located or disposed downstream of control valves 108. Expansion joint 110 may provide for absorption of relational movements between activated carbon silo 102 and other downstream units, controls, devices and the like. Some exemplary relational movements may be heat induced, vibratory, and the like. In one embodiment, expansion joint 110 may be located between control valves 108 and a feeder hopper 112. System 100 may also include a valve, such as a rotary valve 114 that may be located or disposed between feeder hopper 112 and one or more load cells 116. System 100 may also include a screw feeder 118 disposed or located downstream of the load cells 116. In another embodiment, PAC 104 may be controlled or metered with any typical device known to those skilled in the art.

System 100 may further include a flow eductor 120 that is located downstream of 118. System 100 may also include a blower 122 for providing an air flow post flow eductor 120. At this point, PAC 104 may be introduced to the pneumatic conveying gas produced by blower 122 through flow eductor 120 that combines PAC 104 producing a fluid stream for flowing through a transport line 124 to a desired injection location, as further discussed below.

In one embodiment, rotary valve 114, screw feeder 118, load cells 116, blower 122, and flow eductor 120 may modulate and control the pressure and flow of PAC 104 along a transport line 124 to an injection manifold 128 having one or more injection lances 130. Transport line 124 may include bends, such as 90 degree bends 126 or other impediments. Injection manifold 128 and injection lances 130 may be located or disposed in a process line, vessel, transport line, housing, container, etc. ("process line 132") containing a source of gas 134, such as a process gas for controlling or reducing pollutants, and the like.

Figure 3:
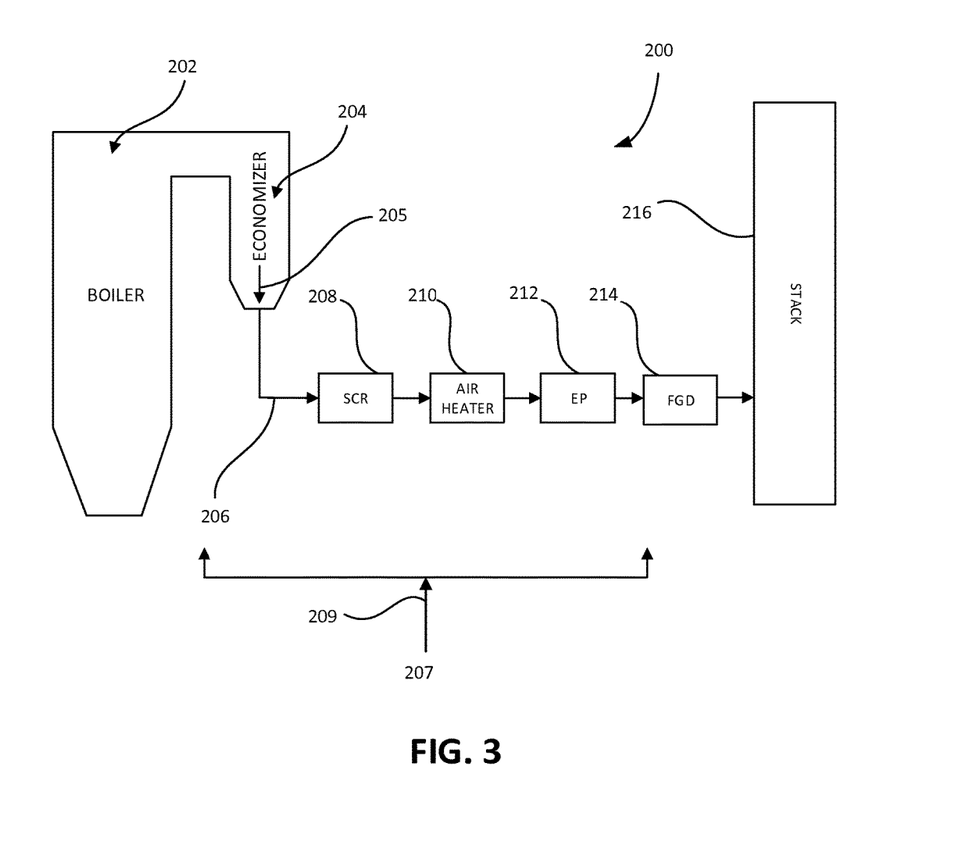
FIG. 3 is a block diagram of a system having injection lances and/or nozzles for injecting powdered activated carbon into process gas according to an embodiment.

Referring now to FIG. 3, another embodiment of a system for injecting PAC into a process gas for controlling or reducing pollutants in a gas stream is schematically illustrated and generally designated 200. System 200 may be a coal-fired electric power generation plant, in one embodiment. System 200 may include a boiler 202, such as for a coal-fired power plant. Although the example described herein applies to coal-fired power plants, the process gas or flue gas to be treated may originate from many industrial facilities such as a power plant, cement plant, waste incinerator, or other facilities that will occur to one skilled in the art.

Such gas streams contain many contaminants and/or pollutants that are desirable to control and/or decrease in concentration for protection of health and the environment. Nevertheless, system 200 is being described for removing, controlling, and/or reducing pollutants from a coal-fired power plant gas stream using one or more of the lances discussed herein. Boiler 202 may be a coal-fired boiler that burns or combusts coal to heat water into superheated steam for driving steam turbines that produce electricity. These types of power plants are common throughout the U.S. and elsewhere. Boiler 202 may further include an economizer 204, in one embodiment. Economizer 204 may be used to recover heat produced from boiler 202.

The flue gas or process gas 205 exiting boiler 202 and/or 204 may then be flowed, transported, ducted, piped, etc. via one or more process lines 206 to a selective catalytic reduction unit 208 for the removal of nitrogen containing compounds, in one embodiment. Typically, selective catalytic reduction unit 208 may convert $NO_x$ compounds to diatomic nitrogen ($N_2$) and water ($H_2O$) using a catalyst and a gaseous reductant, such as an ammonia containing compound.

Process gas 205 may then be flowed, transported, ducted, piped, etc. to a heat exchanger, pre-heater, and/or air heater 210 where heat is transferred from the flue gas to a feed of air to be fed back into boiler 202. Process gas 205 may then be transferred via process line 206 to an electrostatic precipitator 212 for removal of PAC 207, which has been injected into system 200 at some point preferably upstream of electrostatic precipitator 212.

PAC 207 may be injected anywhere along process line 206 from boiler 202 to electrostatic precipitator 212, including boiler 202, economizer 204, selective catalytic reduction unit 208, air heater 210, and/or electrostatic precipitator 212.

After being treated in 212, the treated flue gas may then be sent to a flue gas desulfurization unit 214 via process line 206 for removal of sulfur compounds, in one embodiment. After being treated in flue gas desulfurization unit 214, the treated flue gas may then be sent to a stack 216 for emission into the environment.

Figure 4:
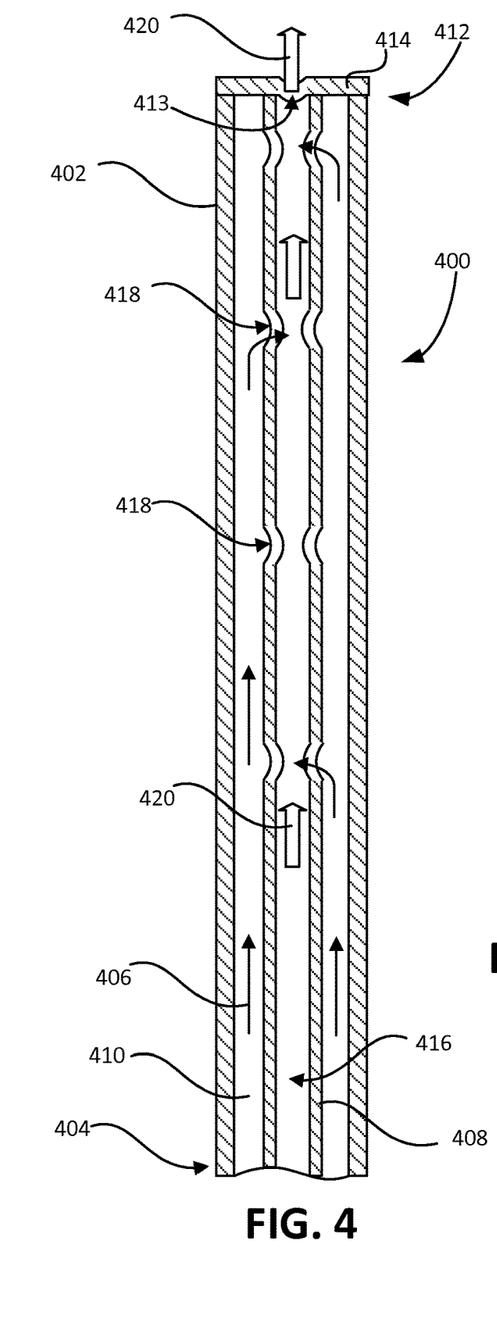
FIG. 4 is a cross section view of a nozzle according to an embodiment.

Turning now to FIG. 4, another embodiment of a lance or nozzle for injecting PAC into a process gas for controlling or reducing pollutants in a gas stream is schematically illustrated and generally designated 400. Nozzle 400 may include an outer tubular member 402 having an end 404 in communication with a source of a gas 406, such as pressurized air in one example. Located and/or disposed within the inner cavity or pathway of outer tubular member 402, is an inner tubular member 408 creating a substantially annular space 410 located and/or disposed between outer tubular member 402 and inner tubular member 408.

Nozzle 400 further includes an end 412 that may be located and/or disposed in a source of process gas, such as process gas 205 and/or gas 134. Additionally, nozzle 400 includes a lance end, nozzle end, and/or outlet 413 that PAC 420 exits out of nozzle 400 where it contacts a process gas, for example. Preferably, end 412 may have a sealed end 414 between outer tubular member 402 and inner tubular member 408, for blocking the flow of gas 406 through the end 412 of annular space 410, in one example. Sealed end 414 may be any common seal, welds, structures, caps, and the like that blocks the flow of gas 406 out end 412 through annular space 410, as would be commonly known to those skilled in the art.

As discussed above, annular space 410 provides a pathway or flowpath for a source of gas 406, such as pressurized gas and/or air. In addition, inner tubular member 408 includes a pathway and/or flowpath 416 for a source of PAC to flow through from end 404 where it exits at end 412 into process gas 205 and/or gas 134, in one embodiment. In one aspect, flowpath 416 is the central via or cavity of inner tubular member 408. In one embodiment, outer tubular member 402 and inner tubular member 408 may be disposed relationally in a co-axial manner. In another embodiment, outer tubular member 402 and inner tubular member 408 may be disposed relationally slightly off-center with respect to their respective longitudinal center axis. Further, the shapes and/or forms of outer tubular member 402 and inner tubular member 408 may have any desired cross-sectional shape, such as circular, triangular, square, polygonal, symmetrical, asymmetrical, and the like. In one embodiment, outer tubular member 402 and inner tubular member 408 are preferably pipes or tubes having substantially hollow inner flowpaths or cavities.

Nozzle 400 may further include one or more orifices 418, such as openings, apertures, and the like disposed therethrough the wall of inner tubular member 408 for providing a flowpath for gas 406 to flow from annular space 410 through orifices 418 into flowpath 416. Orifices 418 may be any form or shape such that they provide a desired flow of gas 406 from annular space 410 to flowpath 416. In one embodiment, one or more orifices 418 may be aligned or staggered through inner tubular member 408.

As shown in FIG. 4, gas 406 flows along annular space 410 and then through orifices 418 to enter flowpath 416. In one embodiment, gas 406 flows through annular space 410 and then through orifices 418 in a radially inward direction into flowpath 416 near end 412. In one embodiment, PAC 420 is pneumatically conveyed through flowpath 416 as gas 406 is sent through annular space 410 and then orifices 418 into flowpath 416. In another embodiment, PAC 420 may be conveyed through flowpath 416 with any type of pressurized carrier gas as would be known to those skilled in the art.

PAC 420 experiences significantly more local acceleration effects and particle collisions at the intersections of the outlet of orifices 418 and flowpath 416 due to the annular gas cross-flow, thereby encouraging the dispersion of particles of PAC 420 to their primary particle size by increasing stress on the agglomerates. The cross-flow also induces more particle-to-particle collisions that will also further decrease the particle size of PAC 420. The degree of dispersion of PAC 420 can be controlled by controlling the ratio of the flow of gas 406 to the flow of gas conveying the PAC 420 and may be dependent on the dimensions of nozzle 400 and powder diameter. Due to the added turbulence and smaller particle sizes, the powder stream leaving nozzle 400 will also disperse to a larger area than the lances typically applied.

Figure 5:
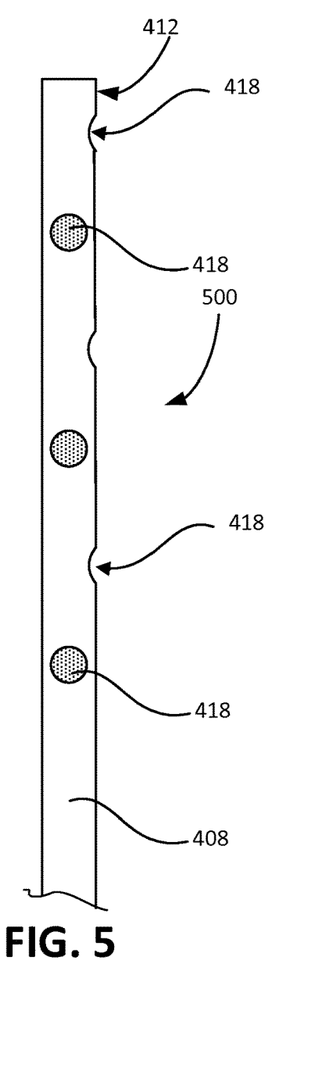
FIG. 5 is a front view of the inner nozzle of the nozzle of FIG. 4 according to an embodiment.

Turning now to FIG. 5, another embodiment of an inner tubular member is schematically illustrated and generally designated 500. As discussed herein, inner tubular member may have any number of orifices therethough, and they may be located or disposed in any desired manner through inner tubular member. In one embodiment, inner tubular member 500 may have orifices 418 located or disposed along the length of inner tubular member 500, such as along one or more positions around the radius of inner tubular member 500. As shown, orifices 418 may have one or more orifices 418 disposed or located along the length of inner tubular member 500 and one or more orifices 418 disposed or located in a different position or side, such as shown in FIG. 5.

Figures 6A, 6B:
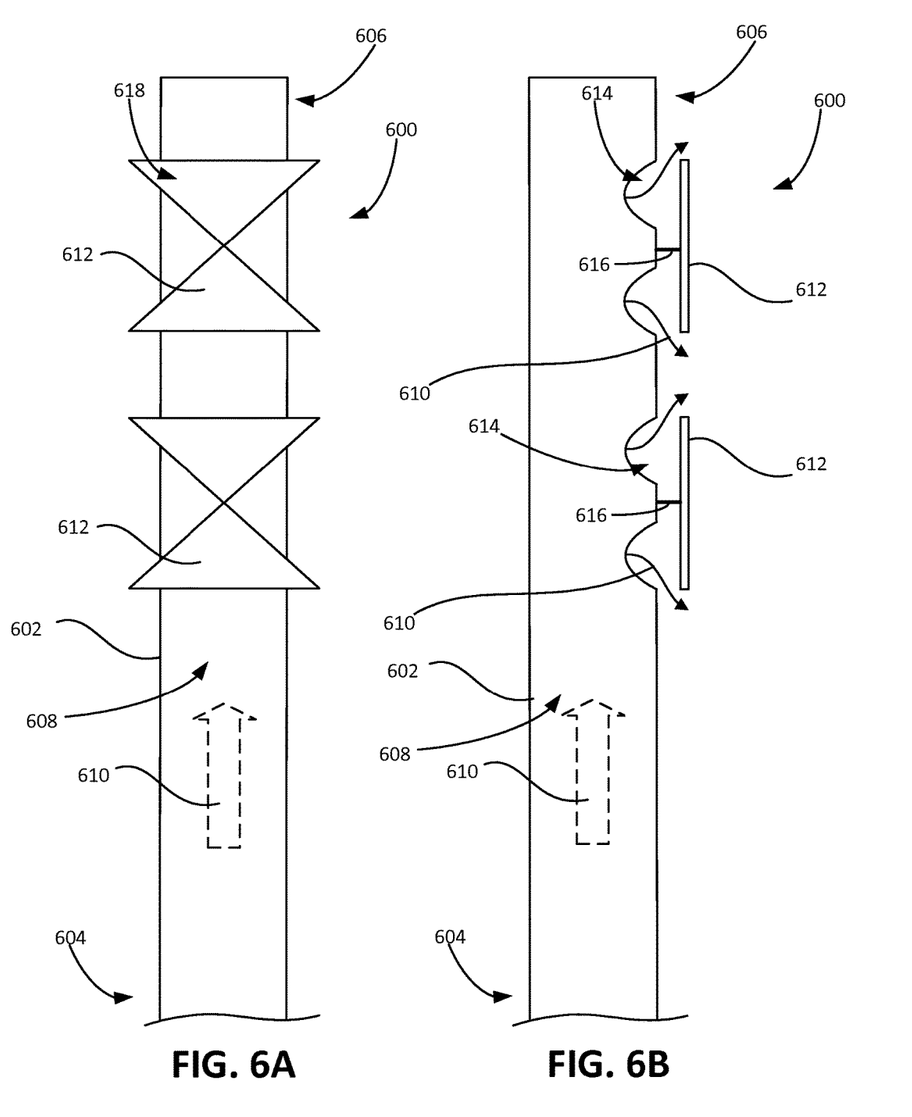
FIG. 6A is a front view of a nozzle having baffles according to an embodiment.
FIG. 6B is a side view of the nozzle of FIG. 6A according to an embodiment.

Referring now to FIGS. 6A-6B, another embodiment of a lance or nozzle for injecting PAC into a process gas for controlling or reducing pollutants in a gas stream is schematically illustrated and generally designated 600. Nozzle 600 may include tubular member 602 having an end 604 in communication with a source of pneumatically conveyed PAC, source of pressurized PAC, and the like. Additionally, nozzle 600 may have a sealed end 606 sealing the end of tubular member 602. Tubular member 602 of nozzle 600 includes a pathway and/or flowpath 608 for a source of PAC 610 to flow from end 604 through flowpath 608. In one aspect, flowpath 608 is the central via or cavity of tubular member 602.

Further, the shapes and/or forms of tubular member 602 may have any desired cross-sectional shape, such as circular, triangular, square, polygonal, symmetrical, asymmetrical, and the like. In one embodiment, tubular member 602 is preferably pipes or tubes having substantially hollow inner flowpaths or cavities.

In one embodiment, nozzle 600 may include one or more flow agitation baffles 612 may be disposed about the outside or outer surface of tubular member 602 for creating a dynamic boundary to induce a turbulent flow profile. Additionally, nozzle 600 may include one or more orifices 614, such as openings, apertures, and the like disposed therethrough the wall of tubular member 602 for providing a flowpath for pressurized and/or pneumatically powered PAC 610 to flow from flowpath 608 through orifices 614 into the turbulent flowpaths created by flow agitation baffles 612.

In one embodiment, flow agitation baffles 612 may be structures having a front profile 618 of a desired form or shape, such as shown in FIG. 6A for producing turbulent flowpaths. As shown, profile 618 is substantially like a triangle with an inverted triangle connected together, but profile 618 may be any shape or form as desired to produce a desired turbulent flowpath. In one aspect, flow agitation baffles 612 may be of a depth such that it can be supported by a support 616 away from the outside or outer wall surface of tubular member 602.

Nozzle 600 may include any number of flow agitation baffles 612 and they may be disposed about the outside or outer wall of tubular member 602 in any pattern desired. For example, flow agitation baffles 612 are shown positioned in a substantially linear orientation along the centerline of tubular member 602. They may also be positioned in a staggered orientation if desired. Further, they may be positioned about tubular member 602 where one or more are in a different position with respect to outer radius of tubular member 602. Additionally, any number of them may be located or disposed about the length and/or radius of tubular member 602. Flow agitation baffles 612 may be made out of any types of materials such that they can operate in the environment where PAC 610 may contact a process gas, for example.

Nozzle 600 may include any number of orifices 614 and they may be located or disposed through tubular member 602. They may be located or disposed along the length and/or radius of tubular member 602, in one aspect. Preferably, they are located or disposed substantially near or proximal to the one or more flow agitation baffles 612 for increasing turbulent flow of PAC 610. In one embodiment, one orifice 614 may be disposed or located on one side of support 616 and another on the other side of support 616 proximal to flow agitation baffles 612.

Support 616 may be any type of support such that it can support flow agitation baffles 612 a desired distance from the outside or outer wall surface of tubular member 602, as best shown in FIG. 6B. Support 616 may be connected at any point on flow agitation baffles 612 and tubular member 602, in one aspect.

Figures 7A, 7B:
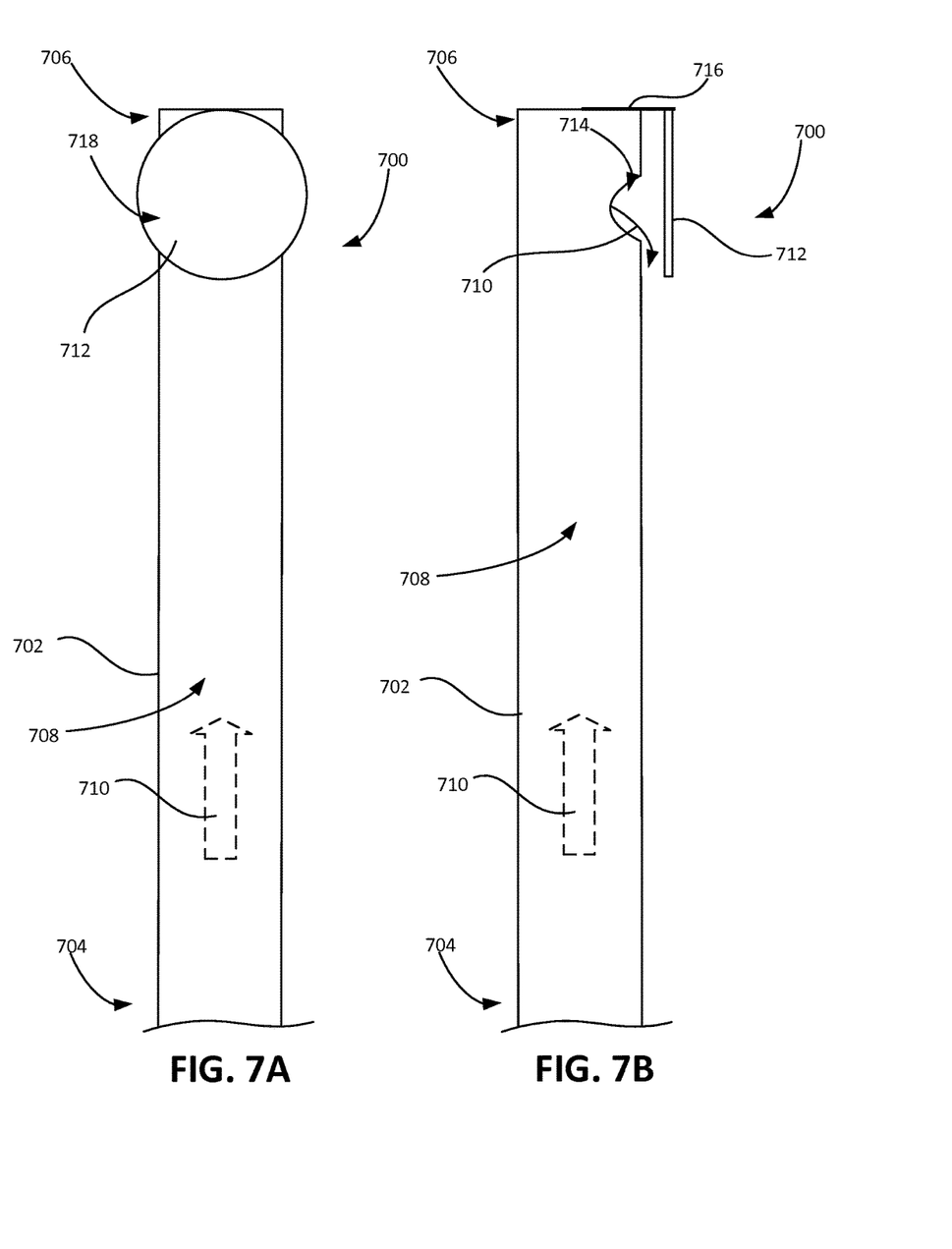
FIG. 7A is a front view of a nozzle having a baffle according to an embodiment.
FIG. 7B is a side view of the nozzle of FIG. 7A according to an embodiment.

Turning now to FIGS. 7A-7B, another embodiment of a lance or nozzle for injecting PAC into a process gas for controlling or reducing pollutants in a gas stream is schematically illustrated and generally designated 700. Nozzle 700 may include tubular member 702 having an end 704 in communication with a source of pneumatically conveyed PAC, source of pressurized PAC, and the like. Additionally, nozzle 700 may have a sealed end 706 sealing the end of tubular member 702. Tubular member 702 of nozzle 700 includes a pathway and/or flowpath 708 for a source of PAC 710 to flow from end 704 through flowpath 708. In one aspect, flowpath 708 is the central via or cavity of tubular member 702.

Further, the shapes and/or forms of tubular member 702 may have any desired cross-sectional shape, such as circular, triangular, square, polygonal, symmetrical, asymmetrical, and the like. In one embodiment, tubular member 702 is preferably pipes or tubes having substantially hollow inner flowpaths or cavities.

In one embodiment, nozzle 700 may include one or more dispersion plates 712 may be disposed about the outside or outer surface of tubular member 702 for creating a dynamic boundary to induce a turbulent flow profile. Additionally, nozzle 700 may include one or more orifices 714, such as openings, apertures, and the like disposed therethrough the wall of tubular member 702 for providing a flowpath for pressurized and/or pneumatically powered PAC 710 to flow from flowpath 708 through orifices 714 into the turbulent flowpaths created by dispersion plate 712.

In this embodiment, nozzle 700 may have one orifice 714 that may have a diameter up to the diameter of tubular member 702.

In one embodiment, dispersion plate 712 may be structures having a front profile 718 of a desired form or shape, such as shown in FIG. 7A for producing turbulent flowpaths. As shown, profile 718 is substantially circular, but profile 718 may be any shape or form as desired to produce a desired turbulent flowpath. In one aspect, dispersion plate 712 may be of a depth such that it can be supported by a support 716 away from the outside or outer wall surface of tubular member 702.

Support 716 may be any type of support such that it can support dispersion plate 712 a desired distance from the outside or outer wall surface of tubular member 702, as best shown in FIG. 7B. Support 716 may be connected at any point on dispersion plate 712 and tubular member 702, in one aspect. In one embodiment, support 716 may be located or disposed about end 706 to support dispersion plate 712.

In one aspect, dispersion plate 712 creates a physical boundary to increase particle-to-particle and particle-to-boundary collisions thereby encouraging dispersion to the primary particle size and also promoting dispersion into the contaminated gas stream.

Figure 8:
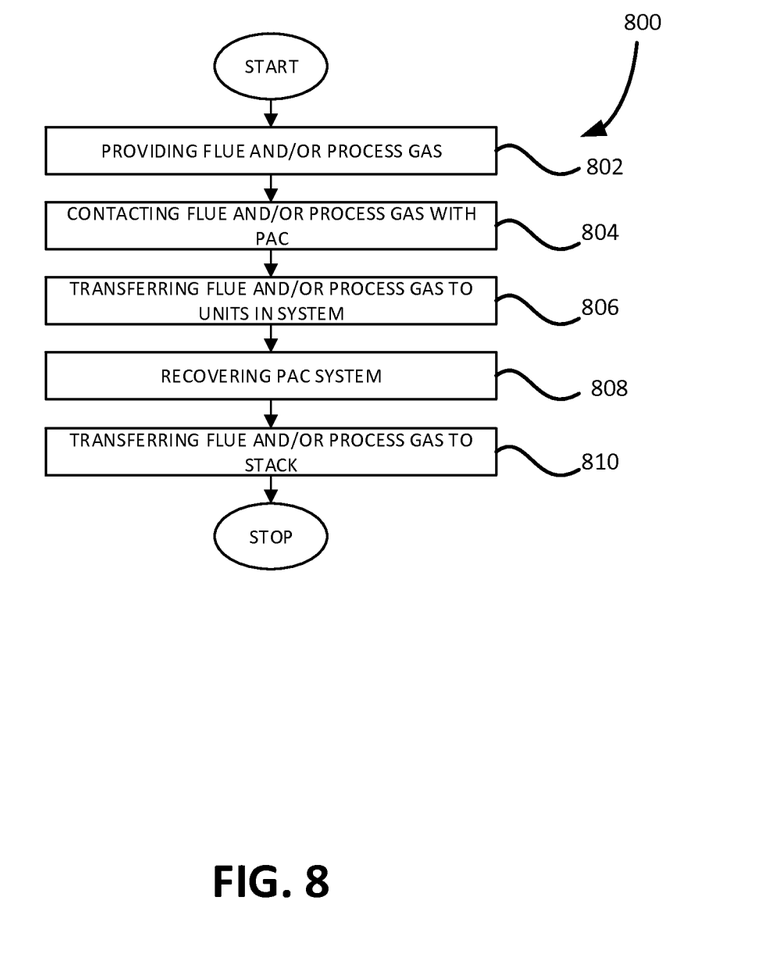
FIG. 8 is a flowchart of a process for controlling multiple pollutants from process gas according to an embodiment.

Turning now to FIG. 8, a method for controlling or removing pollutants or contaminants in flue gas or process gas is schematically illustrated and generally designated 800. In step 802, process or flue gas may be transferred to a pre-heater for heat transfer to an air source to be fed back into a particular unit, such as boiler 202. In step 804, the process or flue gas is transferred to an economizer prior to transferring it to a SCR, such as selective catalytic reduction unit 208. This step may include contacting the process or flue gas with PAC for controlling the pollutants or contaminants. In step 806, the process or flue gas may be transferred air heater and then to an electrostatic precipitator 212. In step 808, the PAC may be recovered or separated from the process or flue gas in the electrostatic precipitator 212. Step 810 may include transferring the treated process or flue gas to stack 216 for emission into the environment.

The following example is intended to provide an illustration of certain aspects, embodiments, and configurations of the disclosure without limiting the disclosure.

An ACI test for mercury removal was conducted at a coal-fired power plant burning high sulfur bituminous coal employing an air heater (AH), electrostatic precipitator (ESP), and wet flue-gas desulfurization unit for pollution control. Ports for ACI lances were installed between the AH and ESP. This location afforded a very short residence time for PAC to remove mercury from the flue gas.

Several lances were installed in the ports and tested with a PAC injection rate of 7 lb/MMacf (million actual cubic feet). Million actual cubic feet Mercury was monitored just downstream of the ESP and percent total mercury removal was calculated by comparing non-injection and injection periods. The results of the test are shown in Table 1. Using the standard lance design 20 typical of the prior art, a straight metal tube 20 with a single slanted open end 26 (FIG. 1B1-1B2), nearly 20% mercury removal was reached at the constant injection rate. Mercury removal dropped slightly when using another prior art lance design 30 with multiple orifices 34 along the pipe length 32 (FIG. 1C1-1C2). However, once lances of the present invention were installed, mercury removal sharply increased. Nozzle or lance 600 (FIG. 6A-6B) increased mercury removal by nearly 90% more than the standard lance 20. Nozzle or lance 700 (FIGS. 7A-7B) increased mercury removal by over 140% more than the prior art standard lance 20. Installing nozzles or lances 600 and/or 700 would have a small capital expense and result in a dramatic decrease in PAC usage and thereby operating costs.

TABLE 1

Summary of Experimental Results

| Nozzle or Lance | Percent Total Mercury Removal |
|---|---|
| Standard Lance 20 of Prior Art (FIGS. 1B1-1B2) | 19.5 |
| Multi-Hole Lance 30 of the Prior Art (FIGS. 1C1-1C2) | 13.4 |
| Lance or Nozzle 600 (FIGS. 6A-6B) | 31.2 |
| Lance or Nozzle 700 (FIGS. 7A-7B) | 47.4 |

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A lance for powder injection resulting in reduced agglomeration, comprising:
   an outer tubular member having a first end, a second end, and an inner flowpath extending from the first end to the second end;
   an inner tubular member having a first end, a second end, and an inner flowpath extending from the first end to the second end, the inner tubular member disposed within the inner flowpath of the outer tubular member for providing an annular space between the outer tubular member and the inner tubular member; and
   one or more orifices in the inner tubular member for providing a flowpath between the annular space and the inner flowpath of the inner tubular member, said one or more orifices being disposed through the longitudinal axis of the inner tubular member,
   wherein the annular space between the outer tubular member and the inner tubular member is sealed at the first end, and wherein the one or more orifices are angled for providing a tangential directional flowpath between the annular space and the inner flowpath of the inner tubular member.

2. The lance for powder injection as recited in claim 1, wherein the first end of the inner tubular member includes one or more of a nozzle, lance end, and outlet.

3. The lance for powder injection as recited in claim 1, wherein the one or more orifices are disposed through the inner tubular member in one or more different radial positions about the circumference of the inner tubular member.

4. The lance for powder injection as recited in claim 1, wherein the inner tubular member and the outer tubular member are substantially coaxial.

5. A powdered activated carbon injection unit, comprising:
   a source of a process gas; and
   a lance in contact with the process gas having an outer tubular member having a first end, a second end, and an inner flowpath extending from the first end to the second end; an inner tubular member having a first end, a second end, and a, inner flowpath extending from the first end to the second end, the inner tubular member disposed within the inner flowpath of the outer tubular member for providing an annular space between the outer tubular member and the inner tubular member; and one or more orifices in the inner tubular member for providing a flowpath between the annular space and the inner flowpath of the inner tubular member, wherein the one or more orifices are angled for providing a tangential directional flowpath between the annular space and the inner flowpath of the inner tubular member.

6. The powdered activated carbon injection unit as recited in claim 5, wherein the annular space is sealed at the first end between the inner tubular member and outer tubular member.

7. The powdered activated carbon injection unit as recited in claim 5, wherein the first end of the inner tubular member includes one or more of a nozzle, lance end, and outlet.

8. A method for powder injection resulting in reduced agglomeration, comprising:
   providing a process gas; and
   providing a lance of claim 1 having a turbulent flow device; and
   injecting dispersed powdered activated carbon into the process gas to reduce agglomeration.

* * * * *